No. 667,597. Patented Feb. 5, 1901.
E. W. STARK.
CULTIVATOR.
(Application filed July 2, 1900.)

(No Model.) 2 Sheets—Sheet 1.

Witnesses
Alfred W. Eicker
J. D. Rippey

Inventor
Edgar W. Stark.
By Higdon & Longan Att'y's

No. 667,597. Patented Feb. 5, 1901.
E. W. STARK.
CULTIVATOR.
(Application filed July 2, 1900.)

(No Model.) 2 Sheets—Sheet 2.

Witnesses
Alfred W. Ericker
J. D. Rippey.

Inventor
Edgar W. Stark.
By Higdon & Largan, Att'ys

UNITED STATES PATENT OFFICE.

EDGAR W. STARK, OF LOUISIANA, MISSOURI.

CULTIVATOR.

SPECIFICATION forming part of Letters Patent No. 667,597, dated February 5, 1901.

Application filed July 2, 1900. Serial No. 22,313. (No model.)

*To all whom it may concern:*

Be it known that I, EDGAR W. STARK, of the city of Louisiana, Pike county, State of Missouri, have invented certain new and useful Improvements in Cultivators, of which the following is a full, clear, and exact description, reference being had to the accompanying drawings, forming a part hereof.

This invention relates to cultivators; and it consists of the novel construction, combination, and arrangement of parts hereinafter shown, described, and claimed.

Figure 1:
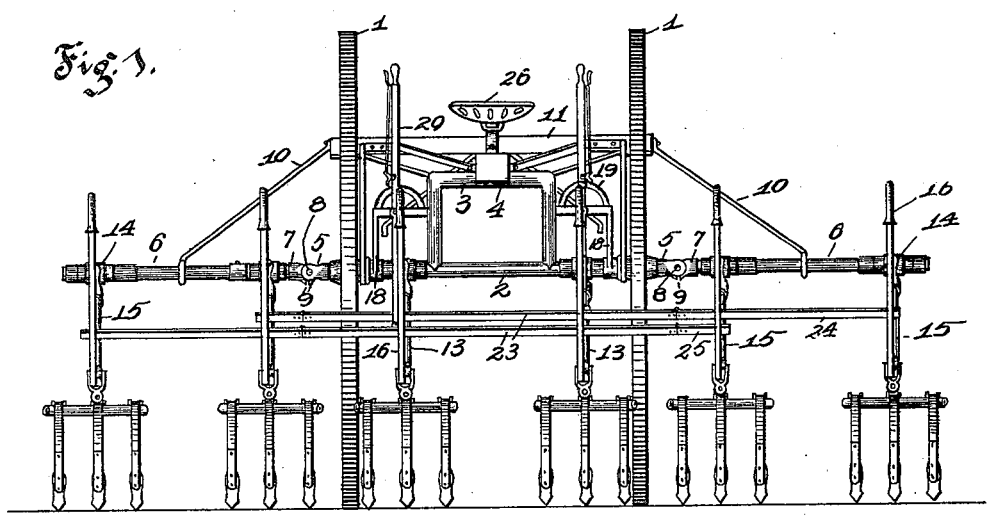
Figure 2:
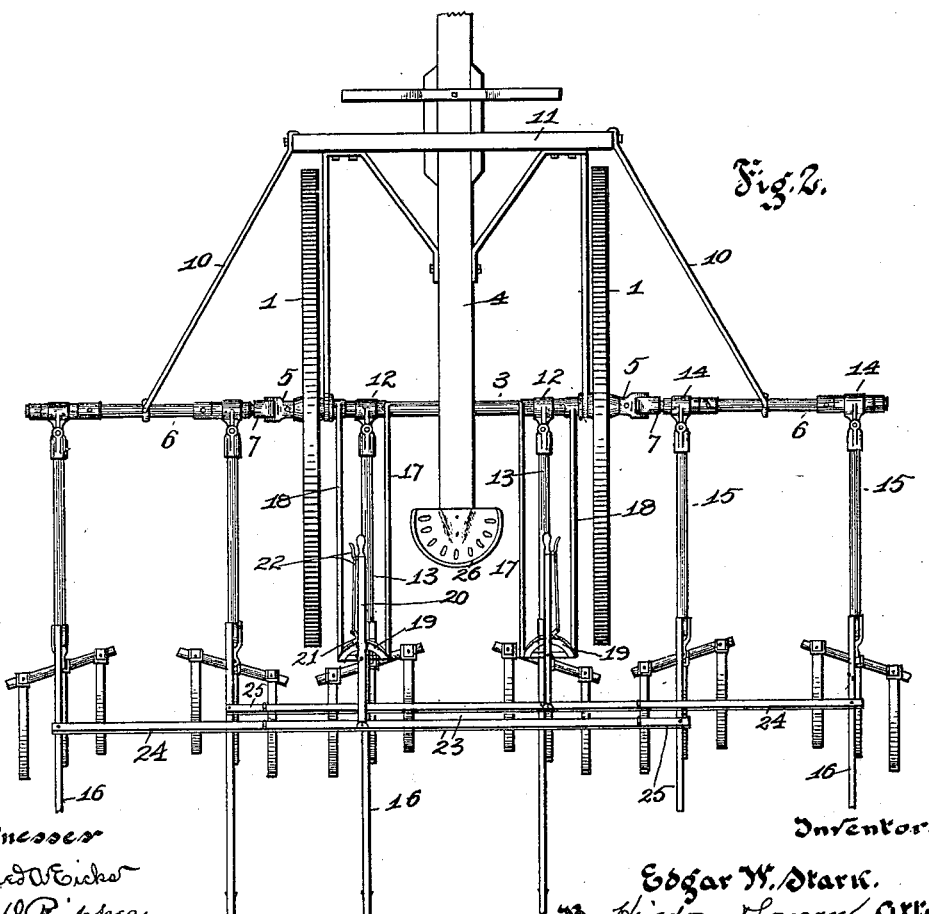
Figure 3:
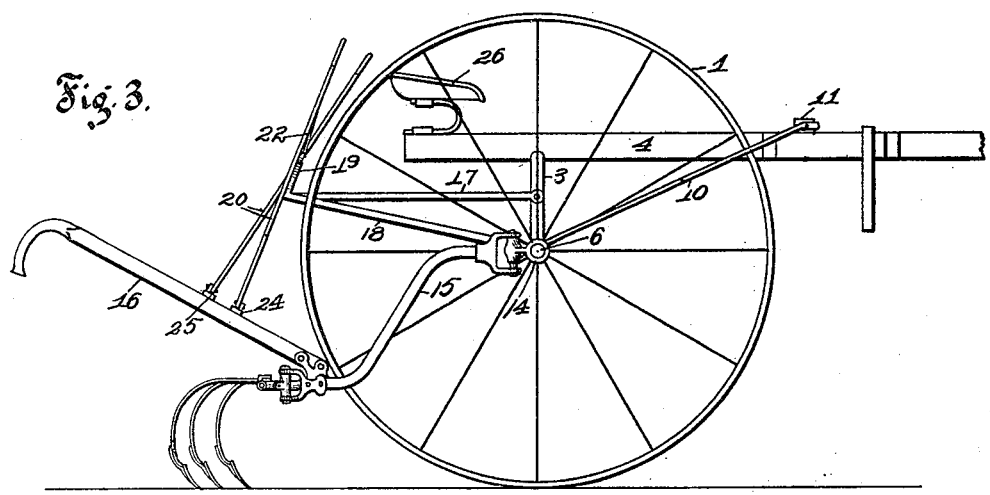
Figure 4:
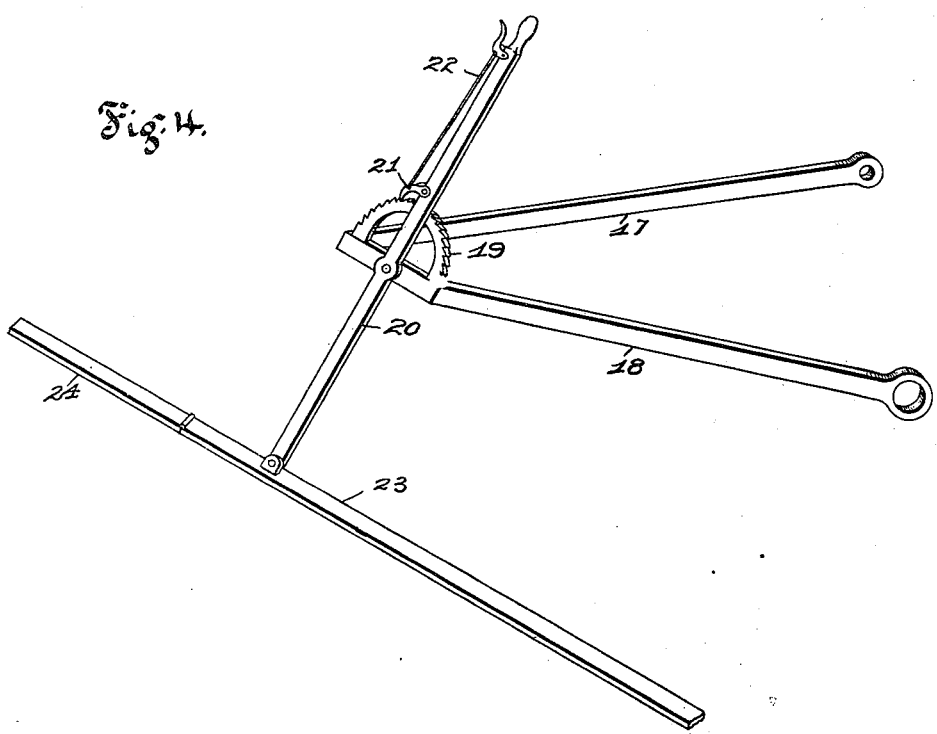

Figure 1 is a rear view of my improved cultivator. Fig. 2 is a plan view. Fig. 3 is a side elevation, and Fig. 4 is a view in perspective of the operating mechanism made use of in carrying out the invention.

Referring to the drawings, 1 indicates traction-wheels, supported by which is a shaft 2, and carried by the said shaft 2 is a frame 3, secured to which is the tongue 4 of the cultivator. The shaft 2 projects outwardly beyond the hubs of the wheels 1 and carries on its outer ends the clips 5, comprising one-half of the knuckle-joints made use of to support the side shafts.

6 indicates the side shafts, carried upon the inner ends of which are the clips 7, which constitute one half of the knuckle-joints, the clips 5 forming the other half, the said clips being pivotally secured together by means of the hinge-pin 8. Integral with the under side of the clips 5 and 7 are shoulders 9, the arrangement of which is such as to allow the shafts 6 to be depressed slightly below a horizontal position before they contact with each other. By this arrangement the shafts 6 are allowed to automatically adjust themselves to the variations in the surface level over which the cultivator is operating and after being lowered a suitable distance, the shoulders 9 on the adjacent clips contact with each other, thereby preventing the shafts 6 from being lowered too far. The shafts 6 are held in the proper alinement by means of the braces 10, secured thereto, the forward ends of the braces being connected to a bar 11, secured upon the tongue 4 at a suitable distance in advance of the wheels 1.

Carried upon the central shaft 2 is a pair of collars 12, to which are secured the central beams 13, and secured upon each of the side shafts 6 is a pair of collars 14, similar in all respects to the collars 12, and connected to the said collars 14 are the beams 15, similar in construction to the beams 13. Secured to the rear ends of the beams 13 and 15 are the ordinary operating-handles 16. It is frequently desired for a single individual to operate the entire number of plows carried by the six beams 13 and 15. I provide a means whereby this may be done, which will now be described.

In Fig. 4 is shown a supporting-frame comprising the arms 17 and 18, the said arms being formed integral with each other. The arms 17, as shown in Fig. 3, are secured to the side of the frame 3, and the arms 18 are connected to the shaft 2. The forward ends of the arms 17 being above the forward ends of the arms 18, the frames will be held in an approximately horizontal position. Carried by the rear ends of the frames are ratchet-segments 19, and pivoted to the connections between the arms 17 and 18 are vertically-operating levers 20, the said levers carrying pawls 21, which operate upon the ratchet-segments 19 and being provided with the usual operating-rods 22. The levers 20 project downwardly a suitable distance and are pivoted at their lower ends to the horizontal bars 23, one of which is pivoted upon each of the central operating-handles 16. The bars 23 are of equal length with the central shaft 2 and are hinged to the outwardly-projecting bars 24, which bars are pivoted at their outer ends to the handles 16, carried by the outermost bars 15. The opposite ends of the bars 23 are hinged to the short bars 25, which are pivoted to the inner member of the outer pair of handles. Thus it is seen that the bars 23, connected to the different levers 20, carried by the opposite frames, are connected to alternate handles, the lever on one side operating the plows which move on the corresponding side of the row and the lever on the opposite side operating the corresponding plows. The upper ends of the levers 20 are arranged adjacent to the seat 26, whereby the operator may readily engage either of the levers and operate the plows at the desired time.

The hinges connecting the bars 23, 24, and 25 are in alinement with the pivot 8, holding the shafts 6 in position. By this means the shafts 6 are allowed free movement and are in no way interfered with by means of the bars carried by the different handles.

By shifting the levers the handles and the plows connected to the beams will be moved laterally, in which position they may be held as long as desired by means of the pawls 21, operating upon the ratchet-segments 19.

By referring to Fig. 3 it is seen that instead of using arch shafts I employ straight or approximately straight shafts, mounted on high traction-wheels, so that the body of the shaft occupies a plane about the height of the usual arch. The plow-beams 15 are bent, as shown, causing the plows to operate in the usual potion and results in much material being saved otherwise used in the large arches and at the same time making the cultivator more economical and fully as efficient.

I claim—

1. A cultivator, comprising a central shaft supported by traction-wheels, side shafts detachably carried by the said central shaft, means for allowing the said side shafts to adjust themselves to the variations in the surface level, plow-beams having the usual operating-handles carried by the said side shafts and the said central shaft, and suitable lever connections whereby the different plow-beams may be operated simultaneously, substantially as specified.

2. A cultivator, comprising a central shaft having lateral extensions pivoted thereto, plow-beams connected to the said shaft and extensions, bars connected to the handles carried by the different plow-beams, supporting-frames carried by the central shaft, operating-levers supported by said supporting-frames, and means whereby the plow-beams may be operated by the operation of the said levers, substantially as specified.

3. A cultivator, comprising a central shaft, extension-shafts pivoted thereto, means for allowing said extension-shafts to adjust themselves to the variations in the surface level, plow-beams connected to the said central shaft and to the said extension-shafts, and means whereby the corresponding plow-beams carried by the different shafts may be operated simultaneously, substantially as specified.

4. A cultivator, comprising a central shaft, side shafts connected to the said central shaft, means whereby the said side shafts may be elevated or lowered out of the plane occupied by the central shaft, plow-beams carried by the said side shafts and by the central shaft, and means whereby the corresponding plow-beams on the different shafts may be operated simultaneously, substantially as specified.

5. A cultivator, comprising a straight central shaft supported by traction-wheels, side shafts pivotally secured to said central shaft and being adapted to adjust themselves to the variations of the surface level, plow-beams having the usual operating-handles carried by the said central and side shafts, the said plow-beams being bent for the purpose set forth, and suitable lever connections for operating the different plow-beams simultaneously, substantially as specified.

In testimony whereof I affix my signature in presence of two witnesses.

EDGAR W. STARK.

Witnesses:
ALFRED A. EICKS,
JOHN D. RIPPEY.